United States Patent [19]
Kelly

[11] Patent Number: 5,717,337
[45] Date of Patent: Feb. 10, 1998

[54] TIME-DOMAIN REFLECTOMETER BASED MEASUREMENT SYSTEM

[76] Inventor: John M. Kelly, 9 Canon Ridge, Fairport, N.Y. 14450

[21] Appl. No.: 585,099

[22] Filed: Jan. 16, 1996

[51] Int. Cl.$^6$ .......................... G01R 31/11; G01F 23/28
[52] U.S. Cl. .................. 324/534; 324/533; 324/642; 73/290 R; 73/304 R
[58] Field of Search ................... 324/522, 527, 324/532, 533, 534, 642, 697; 73/290 R, 304 R

[56] References Cited

U.S. PATENT DOCUMENTS

| | | | |
|---|---|---|---|
| 3,296,862 | 1/1967 | Ziniuk | 73/290 |
| 3,424,002 | 1/1969 | Johnson | 73/290 |
| 3,695,107 | 10/1972 | Hertz et al. | 73/290 R |
| 3,703,829 | 11/1972 | Dougherty | 73/290 R |
| 3,812,422 | 5/1974 | De Carolis | 324/642 |
| 3,853,005 | 12/1974 | Schendel | 73/290 R |
| 3,874,237 | 4/1975 | Zwartz | 73/290 R |
| 3,965,416 | 6/1976 | Friedman | 324/633 |
| 3,995,212 | 11/1976 | Ross | 324/642 |
| 4,006,637 | 2/1977 | Kinosita | 73/313 |
| 4,125,021 | 11/1978 | Kamei et al. | 73/304 R |
| 4,135,397 | 1/1979 | Krake | 73/290 R |
| 4,739,276 | 4/1988 | Graube | 324/534 |
| 4,786,857 | 11/1988 | Mohr et al. | 324/643 |
| 4,807,471 | 2/1989 | Coumane et al. | 73/290 R |
| 4,914,394 | 4/1990 | Meyer | 324/534 |
| 4,924,700 | 5/1990 | Habart | 73/290 V |
| 4,949,076 | 8/1990 | Wann | 324/533 X |

OTHER PUBLICATIONS

Lindstrom, Kjellander & Jonsson, "A New Instrument for the Measurement of Liquid Level" Jul. 1970, pp. 1083–1087, The Review of Scientific Instruments.

*Primary Examiner*—Glenn W. Brown

[57] ABSTRACT

Time-domain reflectometry based measuring systems which include transmission lines having an inner conductor and a ground conductor, a pulse generator generating pulses on the transmission line, and a pulse circuit producing oscillation pulses from pulse reflections caused by disturbances, such as a material interface, within the transmission line. The oscillation pulses induce subsequent transmission line pulses, beneficially using sing-around. A peak detector detecting the peak amplitude of the reflections and producing a trip-point voltage for the pulse circuit may be included. Transmission lines having a wound inner conductor and one or more switched taps which are selectively shorted to the ground conductor may be used. The system oscillates with pulses at frequencies which depend upon the state of the switches. Those frequencies (or periods) can be resolved into a parameter which depends upon the position of a transmission line disturbance. A single-point sensor which assists in calibration may be included.

18 Claims, 2 Drawing Sheets

TIME-DOMAIN REFLECTOMETER BASED MEASUREMENT SYSTEM

FIELD OF THE INVENTION

This invention relates to time domain reflectometer based monitoring systems. More particularly, it relates to time domain reflectometer based monitoring systems which include wound transmission lines.

BACKGROUND OF THE INVENTION

Time-domain reflectometry based monitoring system are known in the prior art. For example, K. Lindstrom, H. Kjellander, and C. Johnson in "A New Instrument for the Measurement of Liquid Level," *The Review of Scientific Instruments*, pages 1083–87, Volume 41, number 7, July 1970 describe a liquid level monitoring instrument in which electromagnetic pulses are impressed on a transmission line comprised of a helical wound inner conductor and a conductive outer shield which is spaced apart from the inner conductor such that a liquid can flow into the space between the inner conductor and the outer shield. Transmission lines having a wound conductor and a spaced-apart ground conductor are referred to herein as wound transmission lines. Lindstrom et al.'s wound transmission line is inserted into a tank which holds a liquid whose level is being monitored. The time required for a pulse to be generated and impressed on the wound transmission line, to travel down the transmission line, to reflect off of the interface between the liquid and a gas which fills the remainder of the wound transmission line, and to return to the point of impression is used to determine the position of the liquid-gas interface within the wound transmission line.

Wound transmission lines are slow wave structures. That is, they are structures in which the speed of pulse propagation along them is slower than the speed of pulse propagation in free space. Slow wave devices are advantageous because they change the problem of determining small time changes of a pulse traveling about 300,000,000 meters per second to the simpler problem of determining small time changes of a pulse which travels slower. For example, Lindstrom et al. reported a pulse speed of about 650,000 meters per second and I have wound transmission lines (described below) having pulse speeds of about 430,000 meters per second.

Lindstrom et al. also disclose the use of sing-around for determining the position of their liquid-gas interface. Sing-around is advantageous since it provides a simple, reliable, low cost method of converting pulse transient times into oscillations have periods and frequencies which are easily measured. In Lindstrom et al.'s sing-around technique a pulse is impressed at the proximal end of a wound transmission line. That pulse travels along that transmission line until it is reflected from a material interface. After reflection the pulse travels back to the proximal end where it is processed to trigger another transmission line pulse. The process keeps repeating, producing a series of pulses at a frequency which depends upon the position of the material interface. The frequency of the series of pulses on the wound transmission line is referred to hereinafter as the transmission line oscillator frequency.

Unfortunately, in addition to the position of the material interface, Lindstrom et al.'s transmission line oscillator frequency also depends upon such factors as the uniformity and stability of the speed of the pulse on the wound transmission line, time delays between the reception of the reflected pulse and the generation of the following transmission line pulse, and the permittivity and permeability of the materials which fill the transmission line and which form the material interface. If the pulse speed was uniform over the full length of the wound transmission line, if the pulse speed was constant with time, temperature, and all other physical parameters, if the length of the wound transmission line was constant, if the time delay between the reception of the reflected pulse and the generation of the following transmission line pulse was constant, and if the characteristics of the materials filling the wound transmission line were constant and uniform, then the transmission line oscillator frequency would vary simply as a function of the position of the material interface.

While the length of the wound transmission line length can, at least for most purposes, be assumed constant, the other factors mentioned in the foregoing paragraph cannot be, at least for most purposes. For example, Lindstrom et al. note that their measurements are not accurate when the liquid-air interface is within either 15 centimeters of the top or 5 centimeters of the bottom of their wound transmission line. From this, and from experiments I have performed on similar transmission lines, I assume that the pulse speed on their wound transmission line is not uniform over the full length of that line. Furthermore, since the winding of a wound transmission lines forms an inductor, and since the inductance of such inductors are known to be age and temperature sensitive, the pulse speed cannot safely be assumed constant with time and temperature. Subsequent experiments on wound transmission lines similar to those described in Lindstrom et al. indicate that the pulse speed of wound transmission lines is neither uniform over the full length nor constant with time and temperature.

Regarding the sensitivity of the transmission line oscillator frequency to changes in time delays between the reception of one reflected pulse and the generation of the following pulse, Lindstrom et al.'s instrument avoids the problem by using high speed electronics to generate the following pulse during the reception of a reflection (the pulses overlap). This, as well as their use of a high speed comparator, reduce the sensitivity of their transmission line oscillator frequency to changes in time delays. While they describe the possible addition of a time delay, they do not discuss or address the sensitivity of the transmission line oscillator frequency to changes in the added time delay. However, Lindstrom et al. do note that changes in the liquid material cause changes in the transmission line oscillator frequency. This sensitivity can be considered a time delay in that the transmission line oscillator frequency changes represent changes in the time required for the reflection to achieve the comparator threshold (which is fixed). Furthermore, it should be apparent that pulse attenuation over long wound transmission lines, particularly those with large winding diameters, can become relatively large. Such attenuation also causes a change in the transmission line oscillator frequency from that which would exist.

Regarding the sensitivity of the transmission line oscillator frequency to changes in the characteristics of the materials which form the dielectric, Lindstrom et al. not only indicate that changes in the liquid material cause measurement changes (see the foregoing paragraph), they also indicate that their measurements are sensitive to changes in the gaseous material which fills part of their wound transmission line. Lindstrom et al. probably underestimate the material change-transmission line oscillator frequency change problem. For example, the permittivities of at least some liquids are temperature and frequency dependent. Therefore, even if the liquid material remains the same composition a temperature change might cause a change in the reflection amplitude and thus induce a transmission line oscillator frequency change. While Lindstrom et al. assign water a permittivity of 80.4 (see Lindstrom et al., Table I), the CRC Handbook of Chemistry and Physics, 73d edition, page 6–10 gives permittivities of water which vary from 87.90 @ 0 Celsius to 55.51 @ 100 Celsius.

Further regarding Lindstrom et al.'s table of permittivities, they are probably functionally inaccurate. Most permittivity tables state that the listed values are only applicable at static or low frequencies (see, for example, Kraus, "Electromagnetics," Table 4-1 on page 134). With pulse based sing-around measurements, such as in Lindstrom et al., it is unlikely that static and low frequency values are pertinent. By decomposing the transmission line pulses into their Fourier components one can see that relatively high frequencies are involved. Thus, the effective permittivity of the liquid which fills the transmission line depends upon not only the liquid, but also the temperature and the Fourier components of the transmission line pulses.

Despite the above-mentioned problems, Lindstrom et al.'s instrument is impressive. They claim a reading accuracy of 0.02% of full scale and a small temperature dependency of 0.01% per degree Celsius. After testing devices similar to that described by Lindstrom et al. I believe that, at least in the short term, in a controlled environment, over a relatively small distance (about 1 meter), by carefully determining the system characteristics, and by avoiding liquid-air interface which occur near the ends of the wound transmission line such accuracy and temperature dependency is not unreasonable.

Interestingly, Lindstrom et al. find the height of the liquid into which their wound transmission line was inserted. That height is determined from:

$$h = const(f_h - f_o)/f_h$$

Where h is the height of the liquid, const is a constant which depends upon the characteristics of the wound transmission line, $f_h$ is the transmission line oscillator frequency with the liquid at the height h, and $f_o$ is the transmission line oscillator frequency which would exist if the liquid was at a zero reference height. Unfortunately, their method of determining h requires a knowing const and $f_o$. While values for const and $f_o$ could be determined once and stored in memory for later use, changes in material compositions, changes in the time delay between the reception of one reflected pulse and the generation of the following pulse, and changes in the transmission line itself, whether due to aging, temperature, or other factors, would cause changes in the actual values of const and $f_o$. That is, the values of const and of $f_o$ which would cause the formula given above to produce the correct distance h.

A solution to the problem of changes in the time delay between the reception of a reflection and the generation of the subsequent pulse is taught by Schendel in U.S. Pat. No. 3,853,005, entitled, "Interface Measuring Apparatus," which issued on 10 Dec. 1974. In that patent Schendel teaches the adding a shorting switch to the input to the transmission line (which could be either a straight wire or a wound transmission line). By selectively closing and opening the shorting switch two frequencies can be generated. When the switch is closed, the transmission line is completely shorted out and the transmission line oscillator frequency relates to the time delays within the electronics package and the time delays in the wiring which connects the electronics package to the input of the transmission line. When the switch is open the transmission line oscillator frequency depends upon the position of the material interface being measured and the time delays within the electronics package and the wiring which connects the electronics package to the transmission line. By comparing the two frequencies a measurement reading of an improved accuracy could be obtained by compensating for the time delays of the electronics package and the wiring which connects the electronics package to the transmission line.

While the teachings of Schendel are beneficial, they may not be optimal when applied to wound transmission lines. By completely shorting out the transmission line only time delay changes in the electronics package and the wiring which connects the electronics package to the transmission line are compensated for. Aging of the transmission line, temperature changes, and changes in the materials filling the transmission line are not. Furthermore, Schendel's teachings does nothing to reduce errors caused by the non-uniform pulse speed along the top most part of wound transmission lines (such as the top 15 cm in Lindstrom et al.'s instrument). It should be noted that non-uniformity in the top most part of the transmission line is much more of a problem then non-uniformity in the bottom most part of the transmission line. This is because as the liquid-air interface level rises toward and into the top most part of a wound transmission line the average speed of a pulse over the full length of the wound transmission line becomes further way from the average pulse speed of the air-exposed portion of the wound transmission line. In contrast, the use of the average pulse speed over the full length of the wound transmission line becomes more accurate as the interface approaches the bottom of the transmission line.

While Lindstrom et al. and Schendel teach useful instruments and techniques, neither system self-calibrates to existing operating conditions. That is, both instruments either require operator assisted set up to match the system operation to the existing operating conditions, or the use of a predetermined system set up which depends upon an assumed operation condition. For example, Lindstrom et al.'s instrument requires that the values of const (which relates to the speed of pulse propagation) and $f_o$ be determined by an operator, while Schendel makes assumptions about the existing conditions (such as the gas which fills the upper part of the transmission line). Changed operating conditions, such as aging of the wound transmission line or temperature changes, or changes in the materials which fill the transmission lines are not compensated for.

Given the above limitations and problems, a technique of compensating time-domain reflectometry based monitoring systems for changes in the amplitude of the reflections, such as which might result from changes in the permittivity of a material partially filling a wound transmission line, or those caused by pulse attenuation, would be useful.

Furthermore, a technique of compensating time-domain reflectometry based monitoring systems which use wound transmission lines for non-uniform pulse speeds, particularly those which occur near the proximal end of the wound transmission lines, would be useful.

Furthermore, self-calibrating time-domain reflectometry based monitoring systems which include wound transmission lines would be useful. Beneficially self-calibration could be performed at any time. Alternatively, a self calibrating system which periodically self calibrates would also be useful.

Time-domain reflectometry based monitoring systems which include wound transmission lines and which automatically compensate for changes in the permittivity and/or permeability, and/or conductivity of materials which fill the wound transmission line would be beneficial.

Finally, improved accuracy time-domain reflectometry based monitoring systems which use wound transmission lines would be useful.

SUMMARY OF THE INVENTION

The principles of the present invention provide for improved time-domain reflectometry based monitoring systems. According to one aspect of the present invention the improved time-domain reflectometry based level monitoring systems include a transmission line, a pulse generator for generating transmission line pulses on the transmission line; a peak detector for producing a trip-point voltage which is a function of the magnitude of the peak amplitude of reflections on the transmission line; and a pulse circuit for producing oscillation pulses when the reflections have amplitudes of a magnitude which exceeds that of the trip-point voltage. Beneficially, the oscillation pulses induce transmission line pulses in a sing-around manner.

According to another aspect of the present invention, an improved time-domain reflectometry based monitoring systems includes a transmission line having a wound inner conductor, a ground conductor, beneficially comprised of an outer shield, and a tap on the wound inner conductor; a switch for selectively shorting the wound inner conductor at the tap substantially to the shield; a pulse generator for generating transmission line pulses on the transmission line; and a pulse circuit for producing oscillation pulses from reflections on the wound transmission line. Beneficially, those oscillation pulses induce transmission line pulses at a transmission line frequency having a first period when the switch is open and at a transmission line frequency having a second period when the switch is closed. Beneficially, a processing unit determines the relative position of a reflection causing disturbance, such as a material interface, from those transmission line frequencies. A single point level sensor may be included to assist in making such systems self-calibrating. A peak detector may be used to establish a trip-point for the pulse circuit. Beneficially, the oscillation pulses induce transmission line pulses in a sing-around manner.

According to another aspect of the present invention, an improved time-domain reflectometry based level monitoring system includes a transmission line having a wound inner conductor, a ground conductor, beneficially a conductive outer shield, a first tap on the wound inner conductor and a second tap on the wound inner conductor; a first switch for selectively shorting the wound inner conductor at the first tap substantially to the ground conductor; a second switch for selectively shorting the wound inner conductor at the second tap substantially to the ground conductor; a pulse generator for generating transmission line pulses on the transmission line; and a pulse circuit for producing oscillation pulses from reflections on the wound transmission line. Beneficially, those oscillation pulses induce transmission line pulses at a transmission line frequency having a first period when the first switch is closed, at a transmission line frequency having a second period when the first switch is open and the second switch is closed, and at a transmission line frequency having a third period when both the first and the second switches are open. Beneficially, a processing unit determines the relative position of a reflection causing disturbance, such as a material interface, from those transmission line frequencies. It is useful to include a peak detector that establishes a trip-point for the pulse circuit. Beneficially, the oscillation pulses induce transmission line pulses in a sing-around manner.

BRIEF DESCRIPTION OF THE DRAWINGS

Other aspects of the present invention will become apparent as the following description proceeds and upon reference to the drawings, in which.

In the drawings, like numbers designate like elements. Additionally, while the text includes directional signals, such as right, left, top, and bottom, those directional signals are taken with respect to the drawings and are meant to aid in understanding the present invention, not to limit it.

DETAILED DESCRIPTION OF THE PREFERRED EMBODIMENT

While the present invention is described in relation to two preferred embodiment liquid level monitoring systems, it is to be understood that the present invention can be incorporated into many other embodiments and in many other applications. For example, the present invention can be used to determine the position of liquid-liquid, solid-liquid, and solid-gas interfaces, as well as the liquid-gas interfaces as is subsequently described. Furthermore, by inserting pulses from multiple positions on the transmission line (such as from both ends) the positions of multiple interfaces on the transmission line can be determined. For example, by inserting a wound transmission line which includes taps (subsequently described) both at the lower portion and at the upper portion into a tank which holds both water and oil and such that the water-oil interface and the air-oil interface are both spanned by the transmission line, by impressing pulses both from the top down and the bottom up, the principles of the present invention can be used to determine the position of both interfaces. Additionally, while the illustrated embodiments operate by sensing changes in transmission line characteristics caused by changes in permittivity, the present invention can also operate by sensing changes in other electrical parameters, such as permeability. Also, while the illustrated embodiments are described in applications which find the levels of liquids in a tank, the measured levels can be related to other quantities such as volume or mass.

Figure 1:
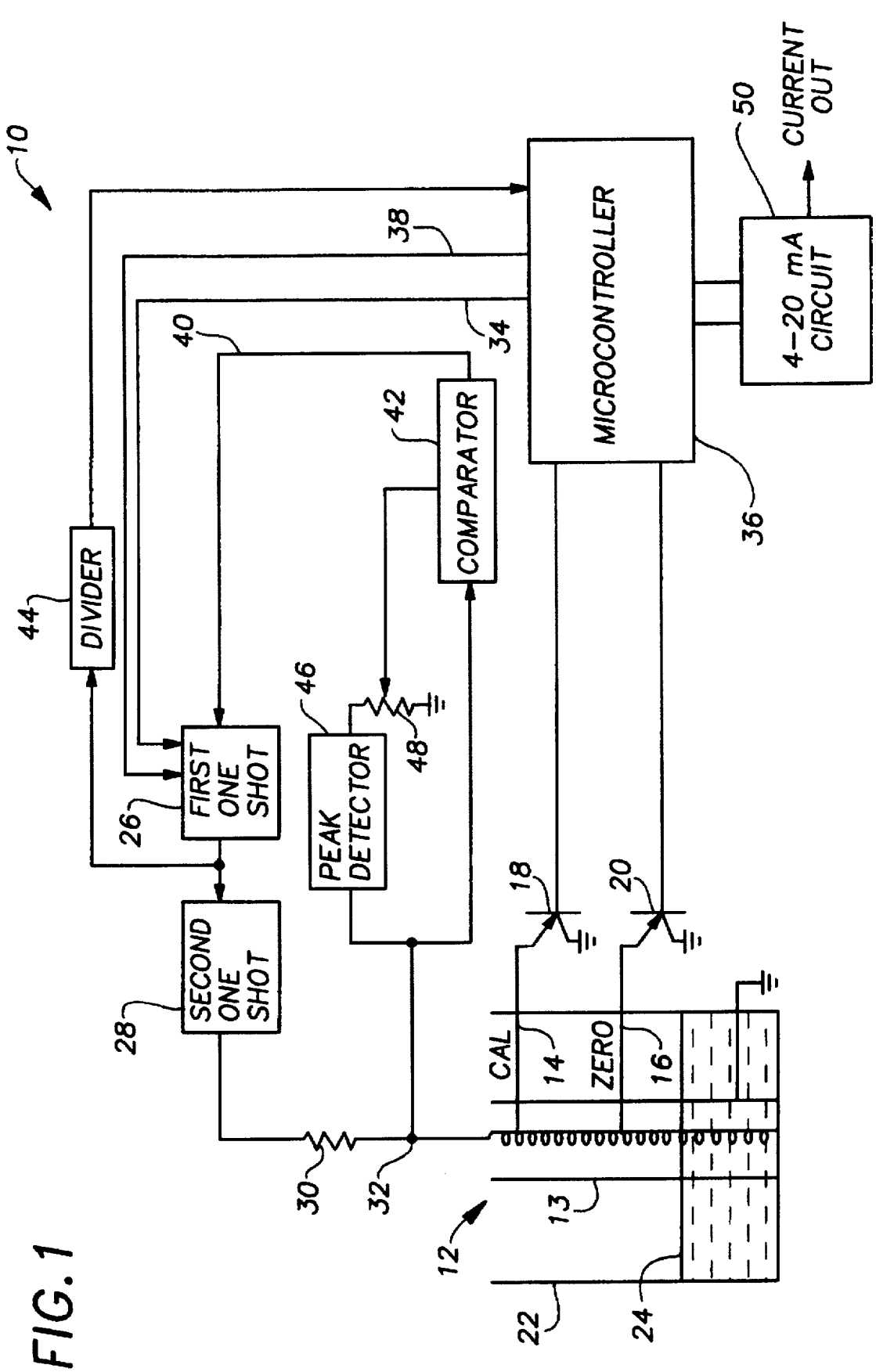
FIG. 1 illustrates, mostly in block diagram form, a first embodiment time-domain reflectometry based monitoring system which is in accord with the principles of the present invention.

FIG. 1 shows a first preferred embodiment time-domain reflectometry based liquid level monitoring system 10 which includes a wound transmission line 12 having a conductive outer shield 13. The transmission line 12 is similar to that described in Lindstrom et al., except that the transmission line 12 is tapped at a CAL tap reference position 14 and at a ZERO tap reference position 16. The CAL tap reference position connects to a transistor 18 while the ZERO tap reference position connects to a transistor 20. Those transistors are configured such that the CAL tap reference position and the ZERO tap reference position can be shorted to ground, which is the potential of the outer shield 13, by the application of base currents to the transistors. Thus the taps can be shorted to the shields. Very low resistance shorts are not required. However, as should be clear after reading and reflecting on this document, the tap position shorts should substantially reflect short duration pulses which are impressed on the transmission line. The distance between the ZERO and CAL tap reference positions, and the distance from the ZERO tap reference position to the distal end of the wound transmission line should be recorded or determined for subsequent use (see below).

The wound transmission line 12 is inserted into a tank 22 which holds a liquid 24 such that the liquid forms an interface with air within that line. The tank and the wound transmission line are dimensioned such that the liquid-air interface remains 1) below the ZERO tap reference position for all possible liquid volumes which are to be held by the tank and 2) above the distal end of the wound transmission line (which is assumed to be the lowest level which the liquid-air interface can achieve). The liquid 24 could be any of a large number of liquids which have a permittivity (or other electrical property) sufficiently greater than that of air such that a short duration pulse traveling down the wound transmission line from the proximal end (the top) reflects from the liquid-air interface such that the magnitude of that reflection is significantly greater than the magnitudes of the reflections from the taps at the CAL and ZERO tap reference positions when the transistors 18 and 20 are turned off. The limitation given above is not very severe, reflections from the taps can be made quite small and most liquids give rather large reflections. Water-air interfaces give particularly good reflections.

Reflections of pulses on the wound transmission line are caused by disturbances in the wound transmission line. A disturbance is anything which causes a significant change in the impedance of the wound transmission line. Typical transmission line disturbances include a liquid-air interface within the wound transmission line, the taps, and the distal end of the transmission line. If the distal end of the transmission line is open the reflections are in the same direction as the arriving pulses (positive pulses creates positive reflections). If the transmission line is shorted to the outer shield, arriving pulses create inverted reflections (positive pulses creates negative reflections). If the transmission line is terminated in its characteristic impedance, arriving pulses are absorbed and not reflected. Lindstrom et al. teach terminating the distal end of the transmission line with its characteristic impedance and provide guidance on selecting that termination. While that is probably good practice, I have had good results when using water without terminating the distal end since reflections from the water-air interface are quite strong.

Wound transmission lines may be constructed as described in Lindstrom et al., but with the addition of wire taps at the CAL tap reference position and at the ZERO tap reference position. However, the wound transmission line 12 is made by winding a 48 mm outer diameter section of PVC pipe with a single layer coil having closely spaced turns of 32 gauge copper magnet wire. The film insulation on the 32 gauge wire is of a single build to maximize the turn density and is comprised of a material that resists corrosion and chemical attack by the liquid 24. Pin holes in the film insulation can be anticipated. If the liquid attacks the underlying copper, another type of wire, or a coating of a protective material (such as Teflon) may be added. The outer shield 13 is a 50 mm inner diameter section of copper tubing. The wound transmission line 12 has a pulse speed of about 435,000 meters per second (except near the ends of the transmission line). Lindstrom et al. recommends coating the liquid contacting surfaces with Teflon (or other suitable material) to prevent the liquid from sticking to those surfaces. As the space between the outer shield 13 and the inner windings in the transmission line 12 is small, it might be beneficial to perforate the outer shield 13, particularly when using viscous liquids, to allow the liquid 24 to readily enter the distal end of the transmission line.

The taps at the CAL tap reference position and at the ZERO tap reference position can be made by soldering short sections of 38 gauge wire at the CAL and ZERO tap reference positions during the winding of the inner core. Soldered taps cause relatively small disturbances on the transmission line. For example, a 5V, 110 nanosecond wide pulse impressed through a 2700 ohm resistor (which matched the transmission line 12 so as to maximize the amplitude of the reflections) on the transmission line 12 created a reflection from a water-air interface about 1 meter away of about −1.8 volts peak, but resulted in only about 0.2 volts negative peak reflections from the solder taps. Spot welding may also work.

While wound transmission lines are very important in time domain reflectometry systems similar to that taught by Lindstrom et al., I have found little published work regarding the maximizing of their operating characteristics. However, reference may be had to the following citations for a better understanding of transmission lines and time domain reflectometry systems which use them: U.S. Pat. No. 3,296,862 entitled, "FLUID LEVEL MEASURING APPARATUS," issued to Ziniuk on 10 Jan. 1967; U.S. Pat. No. 3,424,002, entitled, "APPARATUS FOR THE DETERMINATION OF LOCATION OF INTERFACES BETWEEN DIFFERENT MATERIALS," issued to Johnson on 28 Jan. 1969; K. Lindstrom, H. Kjellander, and C. Johnson in "A NEW INSTRUMENT FOR THE MEASUREMENT OF LIQUID LEVEL," *The Review of Scientific Instruments*, pages 1083–87, Volume 41, number 7, July 1970; U.S. Pat. No. 3,695,107, entitled, "METHOD OF MEASURING THE LEVEL OF A MATERIAL IN A TANK, AND AN APPARATUS FOR PRACTICING THIS METHOD," issued to Hertz and Lindstrom on 3 Oct. 1972; U.S. Pat. No. 3,703,829, entitled, "LIQUID QUANTITY GAUGING SYSTEM," issued to Dougherty on 28 Nov. 1972, note his discussion of variable winding density and his discussion of the use of ferromagnetic sleeves; U.S. Pat. No. 3,812,422, entitled, "APPARATUS FOR MEASURING THE LEVELS OF FLUIDS AND THE DIELECTRIC CONSTANTS OF THE SAME," issued to De Carolis on 21 May 1974, specifically note his use of a perforated steel outer shield and a steel inner conductor; U.S. Pat. No. 3,853,005 entitled, "INTERFACE MEASURING APPARATUS," issued to Schendel on 10 Dec. 1974; U.S. Pat. No. 3,874,237, entitled, "LIQUID LEVEL HEIGHT MEASURING APPARATUS," issued to Zwarts on 1 Apr. 1975, specifically note the use of a perforated outer shield, albeit without a wound inner conductor; U.S. Pat. No. 3,965,416, entitled, "DIELECTRIC CONSTANT MEASURING APPARATUS," issued to Friedman on 22 Jun. 1976; U.S. Pat. No. 3,995,212 entitled, "APPARATUS AND METHOD FOR SENSING A LIQUID WITH A SINGLE WIRE TRANSMISSION LINE," issued to Ross on 30 Nov. 1976; U.S. Pat. No. 4,006,637 entitled, "ELECTROMECHANICAL DISPLACEMENT TRANSDUCER," issued to Kinosita on 8 Feb. 1977; U.S. Pat. No. 4,786,857, entitled, "METHOD AND APPARATUS FOR TIME DOMAIN REFLECTOMETRY DETERMINATION OF RELATIVE PROPORTION, FLUID INVENTORY, AND TURBULENCE," issued to Mohr et al. on 22 Nov. 1988; U.S. Pat. No. 4,807,471, entitled, "LEVEL MEASUREMENT FOR STORAGE SILOS" issued to Cournane et al. on 28 Feb. 1989; and U.S. Pat. No. 4,924,700, entitled, "APPARATUS FOR MEASURING STORAGE PARAM- ETERS SUCH AS LEVEL AND TEMPERATURE OF LIQUIDS OR FLUIDS OF DIFFERENT DENSITIES IN A TANK," issued to Habart on 15 May 1990.

Referring once again to FIG. 1, the system 10 includes a first one shot 26 and a second one shot 28. When triggered by a trigger pulse from the first one shot, the second one shot generates a fast rise time transmission line pulse which is applied to the wound transmission line 12 through a resistor 30. The value of the resistor 30 is beneficially selected such that the reflection from the liquid-air interface is maximized. About 2700 ohms is right for the transmission line 12. The width of the transmission line pulse is such that it does not interfere with reflections from the CAL tap position. That is, a transmitted line pulse returns to zero at a node 32 before the leading edge of a reflection from the CAL tap reaches the node 32. The CAL tap position is selected such that the pulse speed below the CAL tap position is substantially uniform. Lindstrom et al. imply that the CAL tap position should be more than about 15 cm from the proximal end of the wound transmission line 12. Since the pulse width required when the CAL tap position is 15 cm is very short, I use a CAL tap position of about 35 cm from the proximal end. I make the ZERO tap position about 50 cm from the proximal end. Those positions are probably not optimal, but they do work.

The first one shot 26 adds a time delay, which is essentially the width of the trigger pulse, between the triggering of the first one shot and the generation of the following transmission line pulse. In a manner which will become clear subsequently, that time delay ensures that the following transmission line pulse does not interfere with the reflection. The operation of the first one shot depends upon the state of a run signal on a run signal line 34 from a microcontroller 36; the occurrence of a start pulse on a start line 38, which is also from that microcontroller; and the occurrence of an oscillation pulse on an oscillate line 40 from a comparator 42. Beneficially the microcontroller 36 is a member of Philips' line of 87C750, 87C751, or 87C752 single chip microcontrollers. Those microcontrollers are economical, provide sufficient memory to control the system 10, and have a good bit-control instruction set. Furthermore, they have a processing unit which is sufficient to compute the required values from the formulas which follow.

When the run signal is HIGH, an oscillation pulse induces a transmission line pulse by causing the first one shot to output a trigger pulse. The rising edge (it is a negative going pulse) of the trigger pulse triggers the second one shot 28 to generate a transmit pulse on the transmission line 12. When the run signal is LOW an oscillation pulse has no effect on the operation of the first one-shot. However, whether the run signal is HIGH or LOW, a start pulse causes the first one shot to generate a trigger pulse which triggers the second one shot. The trigger pulses are also input to a divider circuit 44 which divides the frequency of the trigger pulses (which is actually the transmission line frequency when the transmission line is oscillating). The output of the divider circuit is applied to the internal timer of the microcontroller 36. The state of the run signal enables or disables transmission line oscillations, while start pulses force transmission line pulses onto the transmission line 12.

Still referring to FIG. 1, the node 32 also connects the proximal end of the transmission line 12 and one end of the resistor 30 to the input of a peak detector 46 and to an input of the comparator 42. The peak detector 46 senses the negative peak of the pulse reflections and outputs that peak voltage to a potentiometer 48. The potentiometer divides that peak voltage by a given proportion and applies the resulting proportional voltage, called hereinafter the trip-point voltage, to another input, called hereinafter the trip-point input, of the comparator 42. The comparator outputs an oscillation pulse to the first one shot 26 when the voltage on the node 32 is below the trip point voltage. If the run signal is HIGH, an oscillation pulse induces a transmit pulse from the second one shot as was explained above.

Setting the comparator trip point input at a voltage which is proportional to the peak of the reflection represents a significant improvement over the fixed comparator trip-point system disclosed in Lindstrom et al. With Lindstrom et al.'s instrument the frequency of the transmission line oscillations includes a variable component that relates to the time required for the reflections to reach the trip point. That is, if the reflection amplitude changed, so did the time required to reach the trip point. This trip-point sensitivity is a cause of the problem identified by Lindstrom et al. of a changing liquid in the tank causing variations in measurements. In contrast, by incorporating a comparator trip point which tracks the peak of the reflection the transmission line oscillator frequency becomes stabilized against changes in the amplitude of the reflections. To understand this, consider applying a 5V, 1 microsecond wide pulse having a very fast rise time to the resistor 30. Measured reflections from an air-water interface about 1 meter away from the node 32 start to occur about 4.6 microseconds later, have a peak voltage of about −1.8V, and have a fall time (rise time of the negative going pulse) of about 600 nS. If the comparator trip point was fixed (as in Lindstrom et al.) at −0.9V it would take about 4.9 microseconds from the time of pulse generation till the comparator trip point was reached. Assuming, for purposes of explanation, that the next pulse occurred without delay (the system 10 has a significant time delay), the pulse frequency would be about 204,000 Hz. Now, assuming that the peak voltage of the reflection changed to −0.9V and that the trip point remained at −0.9V. It would then take 5.1 microseconds from the time of pulse generation till the comparator trip point was reached. That corresponds to a frequency of about 196,000 Hz. Thus, prior art time domain reflectometer level monitoring systems which used wound transmission lines were rather sensitive to changes in the amplitude of the reflections. In contrast, assuming that, as in system 10, the trip point is set at a fixed fraction of the peak reflection amplitude, say one-half. Then, with a peak voltage of about −1.8V, and a fall time of about 600 nS it would again take about 4.9 microseconds from the time of pulse generation till the comparator trip point was reached and, again assuming for purposes of explanation that the next pulse occurred without delay, the pulse frequency would again be about 204,000 Hz. However, if the peak voltage of the reflection changed to −0.9V the comparator trip point would change to −0.45V. Since the reflection fall time remains substantially the same it would still take about 4.9 microseconds from the time of pulse generation till the reflection reached the comparator trip point, and the pulse frequency would remain at about 204,000 Hz.

Peak detectors are well known and their designs are rather straightforward. Since reflections tend to be fast and since great precision is not required, the peak detector 46 includes a high-speed comparator. I have successfully used the design found in National Semiconductor's Linear Databook 1, 1988 Edition, on page 4-28, except that I use +5 and −5 volt supplies, an LM311 comparator, a 0.1 uF capacitor for C1, and a TLC271 op-amp for the op-amp buffer.

With the foregoing elements described I will now explain the operational sequence of the system 10 as regards transmission line oscillations. First, the transistors 18 and 20 are forced off to cause the maximum pulse reflections to be from the liquid-air interface. It can be anticipated that those reflections will have peak magnitudes somewhat less than those which will result when one of the transistors 18 or 20 is turned on. The microcontroller 36 then sets the run signal on run signal line 34 LOW to prevent transmission line oscillations. Then, 100 transmission line pulses are forced upon the transmission line by applying 100 start pulses on the start line 38. These 100 pulses are sufficient to enable the peak detector 46 with its potentiometer to establish the proper trip point voltage for the comparator 48 at the given operating conditions. Each of the 100 transmission line pulses beneficially occurs such that only one transmission line pulse exists on the wound transmission line 12 at a time. This is achieved by delaying one transmission line pulse from the next by a period of time which is longer than the time required for a transmission line pulse to travel the full length of the transmission line and to return to node 32. The resistor 30, which is substantially matched to the impedance of the transmission line 12, absorbs the resulting reflections so as to significantly reduce or eliminate multiple reflections on the line. When the pulse reflections are more negative than the comparator trip point the comparator 48 sends oscillate pulses to the first one-shot. However, since the run signal is LOW, those oscillate pulses do not initiate additional transmission line pulses and transmission line oscillations do not occur. After the 100 transmission line pulses have been forced on the wound transmission line 12, the microcontroller stops sending start pulses, but retains the run signal LOW. After a sufficient period of time all reflections on the transmission line have been absorbed by the resistor 30. Then, the run signal is taken HIGH to enable transmission line oscillations and one start pulse is applied to the first one shot to initiate transmission line oscillations. That pulse's reflection from the liquid-air interface, which is the largest reflection on the transmission line, is detected by the comparator 42, which outputs an oscillation pulse to the first one-shot 26. Since the run signal is HIGH the one shot initiates another transmission line pulse and transmission line oscillations occur. The transmission line oscillator frequency (which is the same frequency as the trigger pulses) is divided by the divider circuit 44 and is applied to the microcontroller 36 as described above. The microcontroller determines the number of internal clock timer periods, represented by the number $C_X$, which corresponds to one half of the period of the divided transmission line oscillator frequency when pulses are from the liquid 24. The number $C_X$ is stored for later use. The one-half occurs because the internal clock timer is gated by the positive half of the divided transmission line oscillator frequency.

The microcontroller 36 then shorts the transmission line at the ZERO tap position by turning on the transistor 20. Shorting the transmission line at the ZERO tap position simulates a liquid level at the ZERO tap position. The microcontroller 36 then sets the run signal on the run signal line 34 LOW to prevent transmission line oscillations and once again forces 100 transmission line pulses on the wound transmission line, again to establish the proper trip point, one that now relates to the shorted ZERO tap position (which now causes the largest reflections on the wound transmission line), for the comparator 48 at the existing operating conditions. As before, the 100 transmission line pulses beneficially occur such that only one transmission line pulse exists on the transmission line at any given time. After the 100 transmission line pulses have been forced onto the transmission line, the microcontroller stops sending start pulses, but momentarily retains the run signal LOW. After all of the reflections on the transmission line have been absorbed by the resistor 30 the run signal is taken HIGH to enable transmission line oscillations and one start pulse is applied to the first one shot to initiate transmission line oscillations. Then, the number of internal clock timer periods which corresponds to one half of the period of the divided transmission line oscillator frequency with the ZERO tap position shorted, represented by the number $C_{ZERO}$, is determined. The number $C_{ZERO}$ is stored for later use.

The microcontroller then removes the short on the transmission line at the ZERO tap position by turning transistor 20 off, but shorts out the transmission line at the CAL tap position by turning transistor 18 on. Shorting the transmission line at the CAL tap position simulates a liquid level at the CAL tap position. The microcontroller once again sets the run signal on the run signal line 34 LOW to prevent transmission line oscillations and once again forces 100 transmission line pulses upon the transmission line so as to enable the peak detector 46 to establish the trip point (which now relates to the shorted CAL tap position) for the comparator 48 at the existing operating conditions. As before, the 100 transmission line pulses beneficially occur such that only one transmission line pulse exists on the transmission line at a time. After the 100 transmission line pulses have been forced onto the transmission line, the microcontroller stops sending start pulses but momentarily retains the run signal LOW. After all reflections on the transmission line have been absorbed by the resistor 30, the run signal is taken HIGH to enable transmission line oscillations and one start pulse is applied to the first one shot to initiate transmission line oscillations. Then, the number of internal clock oscillator timer periods which corresponds to the period of the divided transmission line oscillator frequency with the CAL tap position shorted, represented by the number $C_{CAL}$, is determined. The number $C_{CAL}$ is stored for later use.

With the timer values $C_X$, $C_{ZERO}$, and $C_{CAL}$ determined, the processing unit within the microcontroller 36 uses those timer values to determine a hexadecimal number which causes a 4–20 mA circuit 50 to output a current which is proportional to the liquid level. Beneficially the 4–20 mA circuit 50 is an Analog Device AD 420, a digital-to-analog converter, configured for 4–20 mA output.

To understand the process of determining the hexadecimal number that should be applied to the 4–20 mA circuit 50, consider the following equation which relates timer values to distance:

$$X = \rho(C_X - C_{ZERO}) \tag{1}$$

where X is the distance from the ZERO tap reference position to the level of the liquid 24, and ρ is a constant.

Since the pulse speed on the transmission line below the CAL tap reference position is uniform, the constant ρ can be determined from:

$$\rho = X_{CAL} \div (C_{ZERO} - C_{CAL}) \tag{2}$$

where $X_{CAL}$ is a distance between the ZERO tap reference position and the CAL tap position. That distance was earlier determined and recorded for later use. Also, ρ fulfills the equation:

$$\rho = X_{MAX} \div (C_{MAX} - C_{ZERO}) \tag{3}$$

where $X_{MAX}$ is the maximum distance from the ZERO tap reference position to which the liquid level could fall. That distance, which correspond to the distance from the ZERO tap position to the distal end of the transmission line was earlier determined and recorded for later use.

While formulas 1–3 would be useful in determining physical distance, the system 10 outputs current levels which represent the position of the liquid-air interface. To set the proper output current levels, the 4–20 mA circuit requires the proper hexadecimal value. That is, since 4 mA is output when the liquid level is at its lowest point on the transmission line (assumed to be the distal end of the transmission line) and 20 mA is output when the liquid level is at its highest point on the transmission line, then, respectively, 0000H and FFFFH need to be applied to the 4–20 mA circuit. However, the required hexadecimal value depends not only upon the timer values, but also upon the liquid level span, $X_{SPAN}$. The liquid level span is the distance between the liquid level's lowest point and the liquid level's highest point. Essentially, the liquid level span needs to be normalized to a hexadecimal span of FFFFH. That is, when the liquid level is at its lowest point on the transmission line the hexadecimal code 0000H is sent to the 4–20 mA circuit, and when the liquid level reaches its highest point on the transmission line the hexadecimal code FFFFH is sent to the 4–20 mA circuit, and in-between those points the hexadecimal code linearly tracks the liquid level.

In terms of hexadecimal codes the formula (1) can be rewritten as:

$$Code_X = m(C_X - C_{ZERO}) \quad (4)$$

where $Code_X$ is the hexadecimal code at X, m is a mathematical constant that will be determined, and $C_X$ and $C_{ZERO}$ are as given above. While m is a mathematical constant, in physical terms it depends upon the characteristics of the transmission line and time delays within the system 10, and therefore the actual value of m will vary with time and operating conditions.

The value of m can be determined from:

$$m = Code_{CAL} \div (C_{ZERO} - C_{CAL}) \quad (5)$$

Where $Code_{CAL}$ is the hexadecimal code which represents the distance between the ZERO tap reference position and the CAL tap reference position (which is known).

The problem then is to determine $Code_{CAL}$. $Code_{CAL}$ can be determined using the proportionality:

$$10000H \div X_{SPAN} = Code_{CAL} \div X_{CAL} \quad (6)$$

to arrive at the formula:

$$Code_{CAL} = (10000H)(X_{CAL}) \div X_{SPAN} \quad (7)$$

Equations (6) and (7) use 10000H (instead of FFFFH) for simplicity and ease of calculation (it represents a difference of only 1 part in 65, and conceptually, establishes the maximum code at a liquid level overfill).

Now, by combining equations (5) and (7) the value of m can be found from:

$$m = (10000H)(X_{CAL}) \div ((X_{SPAN})(C_{ZERO} - C_{CAL})) \quad (8)$$

Finally, from (8) a possible hexadecimal code which represents the position of the surface of the liquid relative to the ZERO tap reference position is:

$$VALUE1 = (10000H)(X_{CAL})(C_X - C_{ZERO}) \div ((X_{SPAN})(C_{ZERO} - C_{CAL})) \quad (9),$$

or, again $$VALUE1 = m(C_X - C_{ZERO}) \quad (10)$$

While formulas (9) and (10) may be useful in some applications, they give a hexadecimal value which corresponds to the distance from the ZERO tap reference position to the liquid-air interface. In practice it may be preferred to determine a hexadecimal number which represents the liquid level from the bottom of the liquid span. That is easily done using the formula:

$$VALUE2 = 10000H - m(C_X - C_{ZERO}) \quad (11),$$

or $$VALUE2 = 10000H - (10000H)(X_{CAL})(C_X - C_{ZERO}) \div ((X_{SPAN})(C_{ZERO} - C_{CAL})) \quad (12)$$

Where the leading 10000H is added to make the hexadecimal value 10000H when the liquid level is at the ZERO tap reference position and 0000H when is at the bottom of the liquid level span (which as has been explained before, is assumed to be the distal end of the transmission line).

While the VALUE2 is generally preferable to VALUE1, it may not be optimal. Consider that formulas (11) and (12) represents reading from the bottom of the liquid level span all the way up to the ZERO tap reference position. In many applications reading to the ZERO tap reference position may not be desirable. It might be beneficial to offset the reading. That is, to read over a liquid level span which does not reach the ZERO tap reference position. This is done using the formula:

$$VALUE3 = 10000H + OFFSET - m(C_X - C_{ZERO}) \quad (13)$$

Where OFFSET represents a hexadecimal value which corresponds to the OFFSET distance $X_{OFFSET}$. The OFFSET distance is equal to the transmission line measurement length $X_{TL}$ (the distance from the ZERO tap reference position to the bottom of the liquid level span) minus the liquid span $X_{SPAN}$. The timer value corresponding to the OFFSET distance is:

$$C_{OFFSET} = (C_{ZERO} - C_{CAL})(X_{OFFSET}) \div (X_{CAL}) \quad (14),$$

therefore, $$VALUE3 = 10000H + m(C_{ZERO} - C_{CAL})(X_{OFFSET}) \div (X_{CAL}) - m(C_X - C_{ZERO}) \quad (15),$$

or $$VALUE3 = 10000H + m(C_{ZERO} - C_{CAL})(X_{TL} - X_{SPAN}) \div (X_{CAL}) - m(C_X - C_{ZERO}) \quad (16),$$

Formulas (15) and (16) are particularly useful since the distances $X_{TL}$ and $X_{CAL}$ are readily determined during transmission line fabrication (again, assuming that the liquid level span goes all the way to the distal end of the transmission line). Then, by inputting either the distance $X_{OFFSET}$ in formula (15) or the distance $X_{SPAN}$ in formula (16) one can simply and quickly configure the measurement system to a particular application. After the correct hexadecimal value is determined the microcontroller sends that value to the 4–20 mA circuit which then outputs the appropriate current.

The above indicates that the liquid level span goes all the way to the distal end of the transmission line. This is not a requirement, it only simplifies the description of operation of the system 10. If the liquid level span does go all the way to the distal end of the transmission line I recommend that Lindstrom et al.'s admonishment to terminate the transmission line in its characteristic impedance be followed. If the liquid level does not go all the way to the distal end of the transmission line, and I suggest that it shouldn't, simply treat the transmission line as having a maximum length which is at the bottom of the liquid level span. The reason I suggest that the full length of the transmission line should not be used is that as the distal end is approached by the liquid level the readings become relatively inaccurate.

The foregoing has presented formulas which can be programmed into the microcontroller such that the microcontroller's processing unit can determine the proper digital value for the 4–20 mA circuit, and thus a current which represents the position of a liquid-air interface, using a two tapped wound transmission line. Programming microcontrollers to solve the formulas given above, and below, is routine to those skilled in the art of microcontroller programming. Additionally, other outputs besides digital values and currents are possible. For example, alarms or voltage outputs can easily be implement (indeed, the AD 420 digital-to-analog converter can be set up to output voltage levels).

Two tapped wound transmission line systems have the advantage that they can be made self-calibrating. Once the physical constraints of the system are known (such as $X_{CAL}$, $X_{SPAN}$, and $X_{TL}$) two tapped wound transmission line systems can be installed, turned on, and used. Most changes to the system operating characteristics, such as those caused by aging and temperature changes, can be automatically compensated for.

Figure 2:
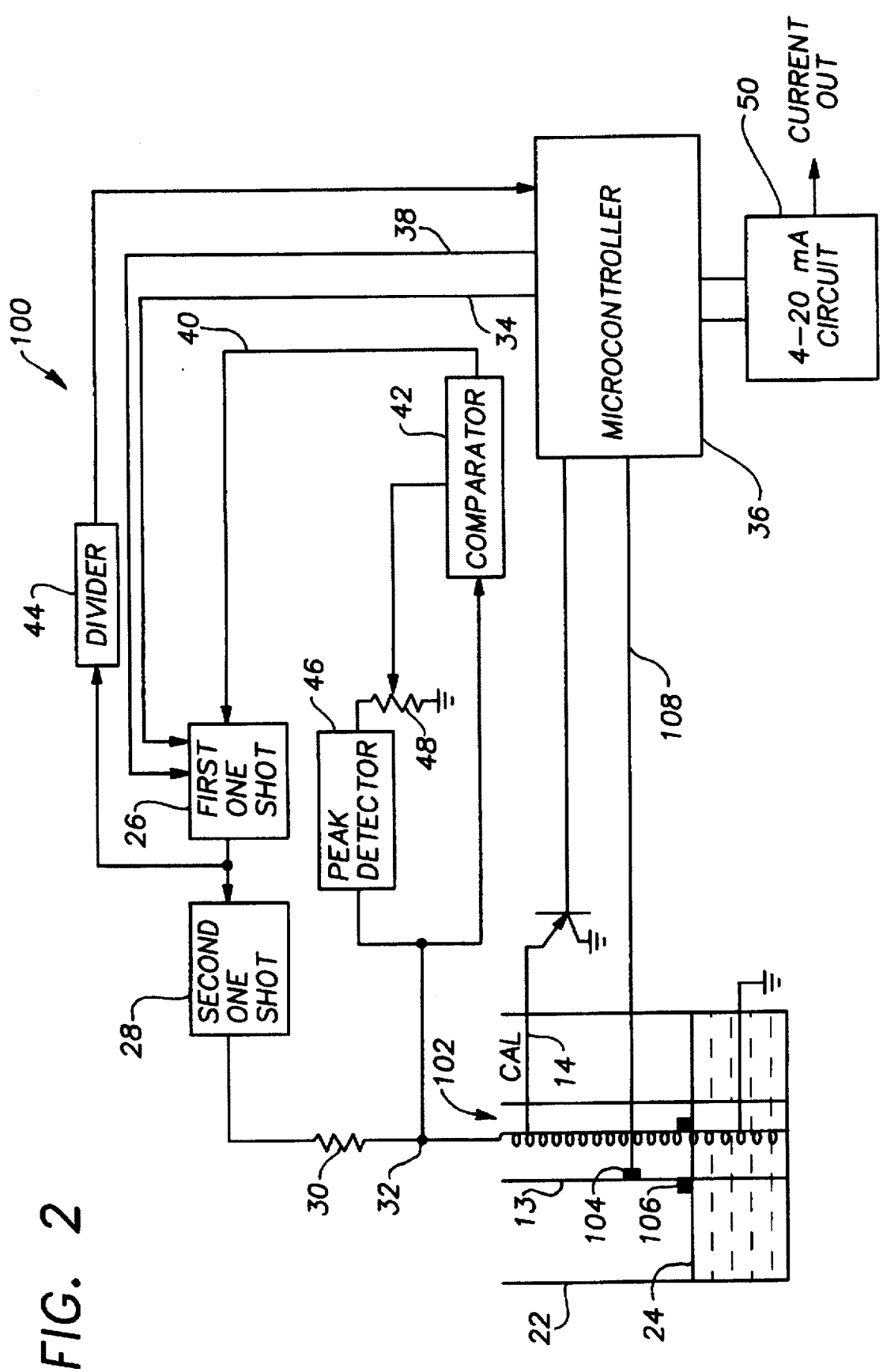
FIG. 2 illustrates, mostly in block diagram form, a second embodiment time-domain reflectometry based monitoring system which is also in accord with the principles of the present invention.

While two tapped wound transmission line systems are believed to be the best implementation of the present invention, good results can also be obtained in systems which use only a one-tap wound transmission line. FIG. 2 illustrates a preferred embodiment one-tap wound transmission line system 100 which incorporates a transmission line 102 that has only one tap at the CAL tap reference position 14. The system 100 also includes a single-point level sensor 104 whose use is explained below. While the actual type of single-point level sensor is not important the system 100 uses a level sensor 104 which senses a floating magnet 106. When the magnet 106 is sensed by the sensor 104, which could be a reed relay or a Hall-effect semiconductor sensor, a signal is applied to the microcontroller 36 via a sensor line 108.

The transmission line oscillator portion of the system 100 is similar to that of the system 10. First, the transistor 18 is forced off so as to cause the maximum pulse reflections to be from the liquid-air interface. The microcontroller 36 sets the run signal on run signal line 34 LOW to prevent transmission line oscillations. Then, 100 transmission line pulses are forced upon the transmission line by applying 100 start pulses on the start line 38 in the same manner and for the same reason described in relation to system 10. After the 100 transmission line pulses have been forced on the transmission line, the microcontroller stops sending start pulses but retains the run signal LOW until all reflections on the transmission line have been absorbed by the resistor 30. Then, the run signal is taken HIGH to enable transmission line oscillations and one start pulse is applied to the first one shot to initiate transmission line oscillations. The transmission line oscillation frequency is divided by the divider circuit 44 and applied to the internal timer of the microcontroller 36 which determines the number of internal clock timer periods, again represented by the number $C_X$, which corresponds to one half of the period of the divided transmission line oscillator frequency when pulses are from the liquid 24. The number $C_X$ is stored for later use.

The microcontroller 36 then shorts the transmission line at the CAL tap position by turning on the transistor 18. Shorting the transmission line at the CAL tap position simulates a liquid level at the CAL tap position. The microcontroller 36 then sets the run signal on the run signal line 34 LOW to prevent transmission line oscillations and once again forces 100 transmission line pulses on the transmission line, again to establish the proper trip point for the comparator 48 at the existing operating conditions. After the 100 transmission line pulses have been forced onto the transmission line, the microcontroller stops sending start pulses, but retains the run signal LOW until all of the reflections on the transmission line have been absorbed by the resistor 30. The run signal is then taken HIGH to enable transmission line oscillations and one start pulse is applied to the first one shot to initiate transmission line oscillations. Then, the number of internal clock timer periods which corresponds to one half of the period of the divided transmission line oscillator frequency with the CAL tap position shorted, again represented by the number $C_{CAL}$, is determined. The number $C_{CAL}$ is stored for later use.

With the CAL tap reference position shorted:

$$F_{CAL}=(td_{electronics}+2\times td_{topmost})^{-1}=(td_{CAL})^{-1}$$

Where $F_{CAL}$ is the transmission line oscillation frequency with the CAL tap reference position shorted, $td_{electronics}$ is the time delay between the occurrence of a reflection at node 32 and the next transmission line pulse, $td_{topmost}$ is the time delay between the application of transmission line pulses to node 32 and those pulses reaching the CAL tap reference position, and $td_{CAL}$ is equal to $(td_{electronics}+2\times td_{topmost})$. Furthermore, $$F_X=(td_{CAL}+2\times td_X)^{-1}$$

Where $F_X$ is the frequency of the transmission line oscillator at the position of the liquid being measured, and $td_X$ is the time required for the transmission line pulse to travel from the CAL tap position to the surface of the liquid 24.

Now $td_X$ is equal to:

$$td_X=X\div v$$

Where v is the speed of the pulse below the CAL tap reference position. Substituting $X\div v$ for $td_X$ in:

$$F_X=(td_{CAL}+2\times td_X)^{-1}:$$

and solving for X:

$$X=(\tfrac{1}{2}v)(1/F_X-td_{CAL})=(\tfrac{1}{2}v)(td_X-td_{CAL})$$

It should be apparent that the timer values $C_X$ and $C_{CAL}$ are related to the values $td_X$-$td_{CAL}$ by the frequency division of divider 44 and by the fact that the timer values are taken over one-half of the divided transmission line oscillator frequency. Therefore:

$$X=Y(C_X-C_{CAL})$$

or, in terms of hexadecimal values for the 4–20 mA circuit:

$$VALUE4=K(C_X-C_{CAL})$$

While the VALUE4 relates to the distance from the CAL tap reference position to the liquid level, other hexadecimal values can be obtained as described above with reference to the system 10.

The only problem that remains is to determine the value K. Unlike systems which use two-tap wound transmission lines, the system 100 requires that the distance X, and the proper hexadecimal value at that distance, be known. From that known distance the value of K can be computed by the microcontroller. Of course it doesn't make sense to have to have to know the distance/hexadecimal value to determine the distance/hexadecimal value. However, it is possible to establish the value K (or Y) at a given time and then assume that the established value is accurate at later times. To so establish K simply place the transmission line 102 in the liquid being measured such that the liquid-air interface is at a known position, determine the transmission line oscillator frequency with the CAL switch open, determine the period of one-half of the divided transmission line oscillator frequency, short the CAL tap reference position by turning on the transistor 18, determine the period of one-half of the divided transmission line oscillator frequency with the CAL tap reference position shorted, and solve for the constant K. That value can then be stored and used subsequently. Alternatively, the transmission line can be calibrated without using a known liquid level at all. Simply short the distal end of the transmission and use the distance from the CAL tap reference position to the distal end of the transmission line as a simulated liquid level.

While one-tap wound transmission line systems can automatically compensate for changes in the time delay of the electronics, pulse speed variations within the topmost part of the transmission line, and changes in the gaseous material which partially fills the transmission line, other changes, such as changes in the value of K, are not automatically compensated for. However, the system 100 updates the value of K by using the single-point level sensor 104 to sense when the liquid-air interface is at a known position. Then, whenever that single-point level sensor senses that the liquid-air interface is at the known position the value of K is automatically updated. Provided the liquid level frequently rises and falls past the single-point position the value of K can be assumed to be accurate, and thus the level measurement can be assumed accurate.

It is to be understood that while the figures and the above description illustrate the present invention, they are exemplary only. Others who are skilled in the applicable arts will recognize numerous modifications and adaptations of the illustrated embodiments which will remain within the principles of the present invention. Therefore, the present invention is to be limited only by the appended claims.

What is claimed:

1. A measuring system comprised of:
a transmission line;
a pulse generator for generating transmission line pulses on said transmission line;
a peak detector for producing a trip-point voltage which is a function of the peak amplitude of the reflections of the transmission line pulses;
a pulse circuit for producing oscillation pulses when the reflections of the transmission line pulses exceed the trip-point voltage.

2. A measuring system according to claim 1, wherein the oscillation pulses induce transmission line pulses in a sing-around manner.

3. A measuring system according to claim 1, wherein said transmission line includes a helical winding.

4. A measuring system according to claim 1, further including a time delay circuit for receiving said oscillation pulses and for producing trigger pulses which cause transmission line pulses after an additional time delay.

5. A measuring system comprised of:
a transmission line having a wire that forms a helical winding, a grounded conductive outer sheath that surrounds the helical winding, and a tap on the helical winding;
a switch for selectively shorting the helical winding at the tap substantially to the grounded conductive outer sheath;
a pulse generator for generating transmission line pulses on said transmission line; and
a pulse circuit for producing oscillation pulses from reflections of the transmission line pulses;
wherein the oscillation pulses induce transmission line pulses in a sing-around manner having a first period when said switch is open and having a second period when said switch is closed.

6. A measuring system according to claim 5, further including a peak detector for producing a trip-point voltage which is a function of the peak amplitude of the reflections of the transmission line pulses, and wherein said pulse circuit produces oscillation pulses when the amplitude of a reflection has a magnitude greater than that of the trip-point voltage.

7. A measuring system according to claim 6, further including a single point level sensor for detecting a disturbance at a single point.

8. A measuring system according to claim 5, further including a processing unit for determining the relative position of a reflection causing disturbance on the transmission line from the difference between the first period and the second period.

9. A measuring system according to claim 5, further including a time delay circuit for receiving said oscillation pulses and for inducing transmission line pulses after a predetermined time delay.

10. A measuring system according to claim 5, further including a single point level sensor for detecting a disturbance at a single point and for informing a processing unit when a disturbance is at the single point.

11. A measuring system comprised of:
a transmission line comprised of a wound inner conductor, a ground conductor, a first tap on the wound inner conductor, and a second tap on the wound inner conductor;
a first switch for selectively shorting the wound inner conductor at the first tap substantially to the ground conductor;

a second switch for selectively shorting the wound inner conductor at the second tap to substantially to the ground conductor;

a pulse generator for generating transmission line pulses on said transmission line; and a pulse circuit for producing oscillation pulses from reflections of the transmission line pulses.

12. A measuring system according to claim 11, further including a peak detector for producing a trip-point voltage which is a function of the peak amplitude of the reflections of the transmission line pulses, and wherein said pulse circuit produces oscillation pulses when the amplitude of a reflection has a magnitude greater than that of the trip-point voltage.

13. A measuring system according to claim 12, wherein the oscillation pulses induce transmission line pulses in a sing-around manner.

14. A measuring system according to claim 11, wherein the oscillation pulses induce transmission line pulses in a sing-around manner.

15. A measuring system according to claim 14, wherein the transmission line pulses occur at a frequency having a first period when said first switch is closed, at a frequency having a second period when said first switch is open and said second switch is closed, and at a frequency having a third period when said first switch and said second switch are both open.

16. A measuring system according to claim 15, further including a processing unit for determining the relative position of a reflection causing disturbance using the difference between the first period and the second period and using the difference between the third period and the second period.

17. A measuring system according to claim 11, further including a time delay circuit for receiving said oscillation pulses and for inducing transmission line pulses from said oscillation pulses after a predetermined time delay.

18. A measuring system according to claim 11, further including a controller for selectively shorting said first switch and said second switch to the ground conductor.

* * * * *